United States Patent
Bornemann

(10) Patent No.: US 6,236,127 B1
(45) Date of Patent: May 22, 2001

(54) FLYWHEEL ENERGY ACCUMMULATOR

(75) Inventor: Hans Bornemann, Waghäusel (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 0 days.

(21) Appl. No.: 09/375,209

(22) Filed: Aug. 16, 1999

Related U.S. Application Data

(63) Continuation-in-part of application No. PCT/EP98/00852, filed on Feb. 14, 1998.

(30) Foreign Application Priority Data

Mar. 11, 1997 (DE) .............................................. 197 09 674

(51) Int. Cl.⁷ ..................................................... H02K 7/02
(52) U.S. Cl. .......................... 310/74; 310/90.5; 310/178
(58) Field of Search .............................. 310/74, 90 J, 178

(56) References Cited

U.S. PATENT DOCUMENTS

| | | | |
|---|---|---|---|
| 5,160,911 | * 11/1992 | Herring | 335/216 |
| 5,214,981 | * 6/1993 | Weinberger et al. | 74/573 R |
| 5,495,221 | * 2/1996 | Post | 335/299 |
| 5,760,506 | * 6/1998 | Ahistrom et al. | 310/74 |
| 5,789,837 | * 8/1998 | Shin et al. | 310/90.5 |
| 5,801,469 | * 9/1998 | Takahata et al. | 310/90.5 |
| 6,043,577 | * 3/2000 | Bornemann et al. | 310/74 |

FOREIGN PATENT DOCUMENTS

| | | |
|---|---|---|
| 196 08 099 | 2/1997 | (DE) . |
| 0 526 903 | 2/1993 | (EP) . |
| 8 247183 | 9/1996 | (JP) . |
| 8 251869 | 9/1996 | (JP) . |

* cited by examiner

Primary Examiner—Elvin Enad
(74) Attorney, Agent, or Firm—Klaus J. Bach

(57) ABSTRACT

In a flywheel energy accumulator including, in a vacuum-tight housing, a vertical shaft with a rotor of an electric motor/generator arranged in the axial center of the shaft and flywheels mounted on the shaft at opposite sides of the rotor, the electric motor/generator and the flywheels are included in modules, each with a housing ring, which are mounted on top of one another and receive bearing modules including support discs mounted between, and adjacent, the housing rings with superconductive magnetic bearings disposed in the center thereof around the shaft for supporting the shaft with the flywheels and the rotor. The number of superconductive bearings is twice the number of flywheels. The bearing module discs between adjacent flywheels have upper and lower superconductive magnetic bearings and the bearing modules at the axial ends of the shaft and adjacent the rotor carry each only one superconductive magnetic bearing so that the number of superconductive magnetic bearings is greater, by two, than the number of flywheels.

6 Claims, 1 Drawing Sheet

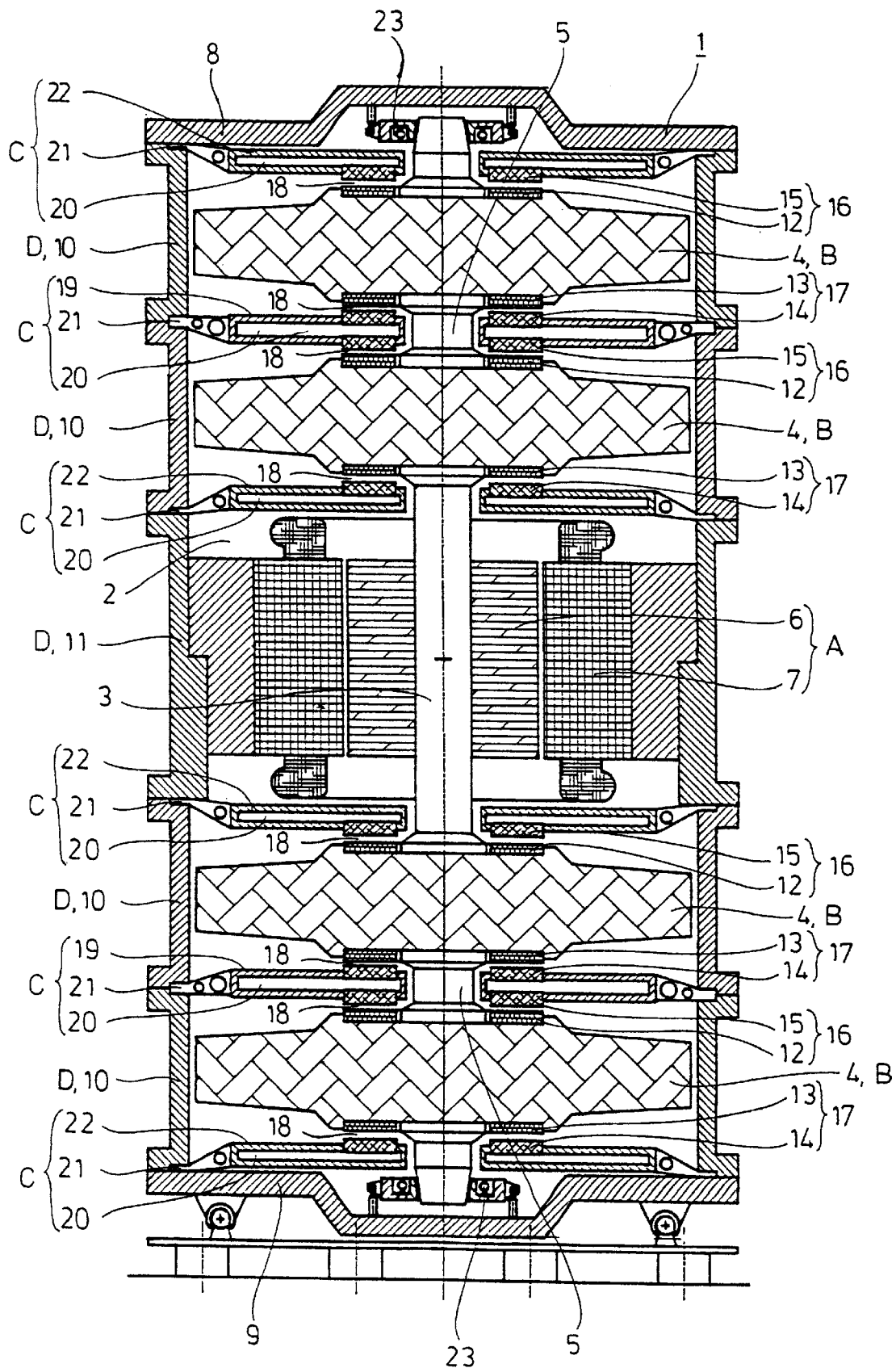

FLYWHEEL ENERGY ACCUMMULATOR

This is a continuation-in-part application of international application PCT/EP98/00852 filed Feb. 14, 1998 and claiming the priority of German application 197 09 674.3 dated Mar. 11, 1997.

BACKGROUND OF THE INVENTION

The present invention resides in a flywheel energy accumulator with a vertical shaft and passive superconductive magnetic axial bearings and an electric motor/generator including a rotor coupled mechanically to several flywheels and a stationary armature with a vacuum housing in which the flywheels are disposed in spaced relationship.

Superconductive magnetic bearings are particularly suitable for supporting relatively large flywheel masses for storing energy with relatively small losses. The superconductive bearings do not require any controls as they are self stabilizing. With flywheel energy accumulators, electric energy is converted in a motor/generator unit to kinetic energy which is stored in a flywheel disc. It is important that the losses during the storing of the energy are minimized so as to retain as much as possible of the stored energy. For this reason, the rotor of the system is supported without mechanical contacts by superconductive magnets as pointed out earlier.

U.S. Pat. No. 6,043,577 discloses a flywheel energy accumulator with a vertical shaft and passive superconductive magnetic axial bearings. However, the energy storage capability of this accumulator, which cannot be easily geometrically enlarged, is insufficient for electrical power networks or even for use in motor vehicles.

It is the object of the present invention to provide an improved flywheel energy accummulator with an energy storage capacity and a performance in the range of 1 to 5 MW and 50 to 150 kwh.

SUMMARY OF THE INVENTION

In a flywheel energy accumulator including, in a vacuum-tight housing, a vertical shaft with a rotor of an electric motor/generator arranged in the axial center of the shaft and flywheels mounted on the shaft at opposite sides of the rotor, the electric motor/generator and the flywheels are included in modules, each with a housing ring, which are mounted on top of one another and receive bearing modules including support discs mounted between, and adjacent, the housing rings with superconductive magnetic bearings disposed in the center thereof around the shaft for supporting the shaft with the flywheels and the rotor. The number of superconductive bearings is twice the number of flywheels. The bearing module discs between adjacent flywheels have upper and lower superconductive magnetic bearings and the bearing modules at the axial ends of the shaft and adjacent the rotor carry each only one superconductive magnetic bearing so that the number of superconductive magnetic bearings is greater, by two, than the number of flywheels.

With the modular design of the flywheel energy accumulator according to the invention particular advantages are obtained: By the combination of various motor/generator modules with several flywheel modules a large spectrum of applications can be covered. If, for example, a high power output, but relatively low energy storage capacity or medium power output and high energy storage capacity are desired, the desired configuration can be accommodated simply by a selection of certain modules or by the addition or elimination of certain modules. For example, in order to increase the energy storage capacity additional flywheel modules with the respective additional bearings and cryostat modules may be added above and below the motor/generator unit and connected to the rotor shaft.

The invention will be described below in greater detail on the basis of the accompanying drawing.

BRIEF DESCRIPTION OF THE DRAWINGS

The sole FIGURE is a cross-sectional view of the flywheel energy accumulator according to the invention.

DESCRIPTION OF A PREFERRED EMBODIMENT

Flywheel energy accumulators of the type as described earlier consist generally of the following components: a flywheel disc, superconductive magnetic bearings (SMB), a drive unit—normally a synchronous motor—, a vacuum housing for receiving the components and the associated pumps and sensors.

In the embodiment of a flywheel accumulator as shown in the FIGURE all the components are disposed in a vacuum housing 1 and, respectively, 10, 11 enclosing a vacuum space 2 and closed by upper and lower covers 8 and 9. An essential element of the energy accumulator is the vertical rotatable shaft 3 carrying several flywheels 4 disposed thereon in axially spaced relationship. In the embodiment shown four flywheels 4 are provided wherein the shaft 3 extends through the flywheels, the flywheels being held in spaced relationship by spacer members 5. The flywheels 4 may be identical in their shapes and dimensions. It is particularly advantageous if they all have the same weight and are arranged symmetrically with respect to the central rotor 6 of the electrodynamic machine which may be for example a homopolar machine with a center rotor serving as an electric motor or a generator. The rotor 6 may include two pole elements displaced by 90° with respect to each other. Around the rotor 6, which may be part of the shaft 3, the stator 7 of the electrodynamic machine is firmly mounted in the housing 1. The windings of the stator 7 generate in the stator 7 a rotating magnetic field, which is effective on the pole elements of the rotor 6 so as to cause the shaft 2 to rotate.

In this way, the electric energy applied to the dynamo-electric machine is converted to rotational energy of the flywheels 1.

An important feature of the flywheel energy accumulator according to the invention is that it consists of individual modules, which are mounted on top of each other and interconnected. The central element is the motor/generator, which is arranged in the center and designated as module A. It comprises a central housing ring 11. The housing rings 10 are all identical and are flanged in a vacuum-tight manner to the central housing ring 11 and to one another, respectively. They are designated as housing modules D. An upper cover 8 is mounted onto the uppermost housing ring 10 and a lower cover 9 is mounted onto the bottom housing ring 10. Altogether, they form the vacuum housing 1 in which all the components of the flywheel energy accumulator are contained.

Above and below the central motor/generator module, the four flywheels 4 are arranged vertically on top of one another on the central shaft 3. They form exchangeable flywheel modules B. The flywheels 4 are mounted on the shaft 3 in a wellknown manner not shown in the drawing and they are located in spaced relationship by spacer members 5.

The flywheels 4 or, respectively, the modules B are preferably all the same. In the arrangement as shown in the FIGURE, they consist of carbon fiber reinforced plastic having an energy content of 12.5 Kwh at a rotational speed of over 10,000 r/min and a weight of 312 kg. On each flywheel 4, a flat upper annular permanent magnet 12 and an identical flat lower annular permanent magnet 13 is disposed through which the shaft 3 extends. The permanent magnets 12 and 13 form for each flywheel 3, the rotating parts of upper and lower superconductive magnetic bearings (SMB's) 16 and 17, which include annular upper and lower superconductors 14 and 15 disposed opposite the permanent magnets and separated therefrom by a gap 18.

The upper and the lower superconductors 14 and 15 are each received in the upper and lower sides of an annular hollow discs 19 whose hollow spaces 20 form a cryostat for each pair of superconductors 14 and 15. The superconductors 14 and 15 are so arranged that their rear surfaces are exposed to the hollow spaces 20. In this way, the upper and lower superconductors 14, 15 can be cooled by a common cryostat disposed in the space 20. The hollow disc 19, together with the superconductors 14 and 15, forms a bearing and cryostat module C, that is, the discs 19 take up the bearing load and transfer it to the housing 1 and, at the same time, form the cryostat for the SMB. For this purpose, in the embodiment according to the FIGURE, the edges 21 of the hollow discs 19, 22 are fittingly mounted between the housing rings 10, the center housing ring 10 and the covers 8, 9, respectively. The hollow discs 22 adjacent the covers 8 and 9 and adjacent the dynamoelectric machine A with the rotor 6 are differently shaped. These discs 22 are provided—in contrast to the hollow discs 19—only with an upper superconductor 14 or a lower superconductor 15, respectively, since they form the final discs adjacent the housing ends or the rotor of the dynamoelectric machine, respectively, so that they have a flywheel magnet 12 disposed only at one of their sides.

The bearing and cryostat modules C with two superconductors 14 and 15 on the disc 19 are arranged between the flywheel modules B. The modules C with one superconductor 14 or 15 are arranged each between the motor/generator module A and the fly-wheel module B or at the upper and lower ends of the shaft 3. As a result, the total number of the various SMB's 13, 14 and 12, 15 and of the SMB modules C is twice the number of flywheel modules B since every flywheel 4 has an upper and a lower SMB 13, 14 and 12, 15. The number of bearing modules C is greater, by two, than the number of flywheel modules B. Above and below the rotor 6, there are provided two or more individual fly-wheels 4 between which the SMB's are disposed and which are supported on the housing 1.

The superconductive axial bearings of the machine, which are preferably all of the same design, are important elements of the flywheel energy accummulator. All the bearings include annular magnets 12, 13, which rotate with the shaft 3 and with the flywheels 4, superconductors 15, 14 mounted firmly with respect to the housing 1 on a kryostat disc 22. The superconductors 14, 15 are annular like the permanent magnets 12, 13 and are embedded with one of their sides in the kryostat discs 22 in such a way that their other sides are disposed opposite the respective permanent magnets 12, 13. The annular magnets 12, 13 are so arranged that a narrow gap 18 is formed between their outer surfaces and the respective adjacent superconductors 14, 15.

The cryostats or operated in a well-known manner, which is not described herein. They are disposed in the vacuum space 2 that is within the housing 1 and are insulated thermically toward the outside. The cooling of the SMB's 16 and 17 is achieved in the embodiment shown by liquid nitrogen passing therethrough. Energy for the cooling devices can be provided directly by the flywheels.

In addition to the SMB's 16 and 17 axial thrust ball bearings 23 are provided at the upper and the lower ends of the shaft 3. These bearings are provided as emergency bearings to take up the weight of the shaft 3, the flywheels and the rotor if the SMB's 16 and 17 should fail. However, during energy storage operation, the bearings 23 are not in use, that is, there is no bearing friction, which may detrimentally affect the energy storage capability.

The electric machine that is the motor/generator 6, 7 is de-energized in the energy storage phase, that is, when the flywheels are rotating idly in order to avoid eddy current losses. Since the housing 1 is evacuated, there are no air friction losses either. For a high efficiency of the accumulator, it is important that the rotor operates at high rotational speeds. This provides for a high power and energy storage capability on the basis of weight while providing for optimal utilization of the flywheel disc material.

In the embodiment shown in the FIGURE, a stored energy of 50 kwh is distributed over altogether four flywheels 4 within the flywheel modules B. Six bearing modules C are provided. The power output of the motor/generator unit is 500 kw.

What is claimed is:

1. A flywheel energy accumulator including, disposed in a vacuum-tight housing, a vertical shaft, supported on superconductive magnetic axial bearings (SMB), an electric motor/generator having a stator mounted in said housing and a rotor mounted on said vertical shaft so as to be disposed within said stator, and a number of flywheels also mounted on said shaft at opposite sides of said rotor, said energy accummulator having the following features:

a) the flywheels are disposed on said shaft at opposite sides of said electric motor/generator on top of one another in axially spaced relationship and said rotor of said electric motor/generator is disposed centrally between said flywheels, b) an annular permanent magnet of a first, lower superconductive passive axial bearing is disposed below the lowermost flywheel forming an axial thrust bearing and an annular permanent magnet of a second upper superconductive passive axial bearing is disposed above the uppermost superconductive axial bearing in the form of an axial pull bearing, and c) disc-like superconductors are supported on said housing so as to be disposed opposite said annular magnets in spaced relationship therefrom, d) the stator which extends around said rotor includes windings capable of generating a rotating magnetic field effective on the rotor, e) said flywheel energy accumulator consists of individual modules which are disposed on top of one another and are interconnected by spacer shaft members, each module including a housing section surrounding a respective one of said electric motor/generator and said flywheels, and bearing modules are mounted between adjacent housing sections and between the uppermost and lowermost housing section and upper and lower housing covers respectively.

f) each of said bearing modules includes a superconductive magnetic axial bearing (SMB) for each of the adjacent flywheels such that the total number of SMB's is twice the number of flywheel modules and each flywheel has an upper and a lower SMB associated therewith, g) each bearing module includes one or two SMB's, respectively, and h) the number of bearing modules is greater, by two, than the number of flywheel modules.

2. A flywheel energy accumulator according to claim 1, including the following additional features:

i) each of the bearing modules disposed between two adjacent flywheels has an SMB mounted at each of its upper and lower sides, j) the bearing modules disposed adjacent the rotor and at the upper and lower ends of the accumulator include each only one bearing module disposed opposite the respective adjacent flywheel.

3. A flywheel energy accumulator according to claim 2, including the following additional features:

k) each of the bearing modules disposed between adjacent flywheels comprises an annular hollow disc with upper and lower sides in which a respective upper and a lower superconductor is disposed and has a hollow space receiving a cryostat for cooling said upper and lower superconductors, said superconductors having rear inner surfaces directly exposed to the hollow space.

4. A flywheel energy accumulator according to claim 1, including the following additional features:

l) said bearing modules disposed adjacent only one flywheel comprises an annular hollow disc having a superconductor disposed in one of its sides and having a hollow space receiving a cryostat for cooling said superconductor, said superconductor having a rear inner surface directly exposed to said hollow space.

5. A flywheel energy accumulator according to claim 1, including the following additional features:

m) said housing consists of a number of housing rings each extending around one of said flywheels, a center housing ring extending around said electric motor/generator and top and bottom covers, said housing rings and said top and bottom covers being flanged together in a vacuum-tight manner and having said bearing modules clamped therebetween for firmly supporting said bearing modules.

6. A flywheel energy accumulator according to claim 1, including the following additional features:

n) said flywheels are positioned on said shaft in spaced relationship by spacer members and are exchangeably mounted on said shaft above and below said electric motor/generator.

\* \* \* \* \*